United States Patent
Lin et al.

(10) Patent No.: US 11,900,557 B2
(45) Date of Patent: Feb. 13, 2024

(54) THREE-DIMENSIONAL FACE MODEL GENERATION METHOD AND APPARATUS, DEVICE, AND MEDIUM

(71) Applicant: TENCENT TECHNOLOGY (SHENZHEN) COMPANY LIMITED, Shenzhen (CN)

(72) Inventors: Xiangkai Lin, Shenzhen (CN); Linchao Bao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 222 days.

(21) Appl. No.: 17/508,679

(22) Filed: Oct. 22, 2021

(65) Prior Publication Data

US 2022/0044491 A1    Feb. 10, 2022

Related U.S. Application Data

(63) Continuation of application No. PCT/CN2020/121168, filed on Oct. 15, 2020.

(30) Foreign Application Priority Data

Dec. 16, 2019   (CN) .................... 201911296472.5

(51) Int. Cl.
  *G06T 19/20*   (2011.01)
  *G06T 7/30*   (2017.01)
  *G06T 17/20*   (2006.01)

(52) U.S. Cl.
  CPC ............... *G06T 19/20* (2013.01); *G06T 7/30* (2017.01); *G06T 17/20* (2013.01);
  (Continued)

(58) Field of Classification Search
  CPC .......... G06T 19/20; G06T 7/30; G06T 17/20; G06T 2207/30201; G06T 2219/2004; G06T 2219/2021
  See application file for complete search history.

(56) References Cited

U.S. PATENT DOCUMENTS

| | | | |
|---|---|---|---|
| 2005/0063582 A1* | 3/2005 | Park .................... | G06T 17/10 382/181 |
| 2016/0246078 A1* | 8/2016 | Choukroun ............ | G06V 40/20 |

(Continued)

FOREIGN PATENT DOCUMENTS

| | | |
|---|---|---|
| CN | 102376100 A | 3/2012 |
| CN | 103606190 A | 2/2014 |

(Continued)

OTHER PUBLICATIONS

The State Intellectual Property Office of the People's Republic of China (SIPO) Office Action 1 for for 201911296472.5 dated Aug. 31, 2020 13 Pages (including translation).

(Continued)

*Primary Examiner* — Yu Chen
(74) *Attorney, Agent, or Firm* — ANOVA LAW GROUP PLLC

(57) ABSTRACT

A three-dimensional face model generation method is provided. The method includes: obtaining an inputted three-dimensional face mesh of a target object; aligning the three-dimensional face mesh with a first three-dimensional face model of a standard object according to face keypoints; performing fitting on the three-dimensional face mesh and a local area of the first three-dimensional face model, to obtain a second three-dimensional face model after local fitting; and performing fitting on the three-dimensional face mesh (Continued)

and a global area of the second three-dimensional face model, to obtain a three-dimensional face model of the target object after global fitting.

20 Claims, 14 Drawing Sheets

(52) U.S. Cl.
CPC ............... *G06T 2207/30201* (2013.01); *G06T 2219/2004* (2013.01); *G06T 2219/2021* (2013.01)

(56) References Cited

U.S. PATENT DOCUMENTS

| | | | |
|---|---|---|---|
| 2017/0091529 A1* | 3/2017 | Beeler | ..................... G06T 7/246 |
| 2017/0091994 A1* | 3/2017 | Beeler | ....................... G06T 7/11 |
| 2021/0174587 A1 | 6/2021 | Zhang | |
| 2021/0241521 A1 | 8/2021 | Zhe et al. | |
| 2022/0008175 A1* | 1/2022 | Öjelund | ................. G06N 20/20 |
| 2022/0076000 A1* | 3/2022 | Yang | .................... G06V 20/597 |
| 2022/0292776 A1* | 9/2022 | Liu | .......................... G06T 17/20 |

FOREIGN PATENT DOCUMENTS

| | | |
|---|---|---|
| CN | 106327571 A | 1/2017 |
| CN | 108876893 A | 11/2018 |
| CN | 109191584 A | 1/2019 |
| CN | 109377563 A | 2/2019 |
| CN | 109685873 A | 4/2019 |
| CN | 109961507 A | 7/2019 |
| CN | 110097644 A | 8/2019 |
| CN | 110415341 A | 11/2019 |
| CN | 111028343 A | 4/2020 |

OTHER PUBLICATIONS

The World Intellectual Property Organization (WIPO) International Search Report for PCT/CN2020/121168 dated Jan. 15, 2021 6 Pages (including translation).

Si Wu, "Research on Occlusion and Pose Robust Facial Landmark Localization," Full-text Database of China's Outstanding Master's Thesis, Jun. 15, 2019 (Jun. 15, 2019), pp. 28-39. 15 pages.

R. W. Sumner et al., "Deformation Transfer for Triangle Meshes," ACM Transactions on Graphics, vol. 23, Issue 3, 2004, pp. 399-405. 7 pages.

Brian Amberg et al., "Optimal Step Nonrigid ICP Algorithms for Surface Registration," IEEE Conference on Computer Vision and Pattern Recognition, 2007. 8 pages.

Hang Dai et al., "Statistical Modeling of Craniofacial Shape and Texture", Nov. 9, 2019, vol. 128, No. 2, International Journal of Computer Vision, 14,15 G06T7/33.

Augusto Salazar et al., "Fully automatic expression-invariant face correspondence", Nov. 16, 2013, vol. 25, No. 4, Machine Vision and Applications, Springer Verlag, DE.

The European Patent Office (EPO) Extended Search Report for EP Application No. 20902556.8 dated Sep. 9, 2022 9 Pages.

* cited by examiner (a) (b)

(a)            (b)

THREE-DIMENSIONAL FACE MODEL GENERATION METHOD AND APPARATUS, DEVICE, AND MEDIUM

RELATED APPLICATION(S)

This application is a continuation application of PCT Patent Application No. PCT/CN2020/121168 filed on Oct. 15, 2020, which claims priority to Chinese Patent Application No. 201911296472.5, entitled "THREE-DIMENSIONAL FACE MODEL GENERATION METHOD AND APPARATUS, DEVICE, AND MEDIUM" filed on Dec. 16, 2019, all of which are incorporated by reference in entirety.

FIELD OF THE TECHNOLOGY

The present disclosure relates to the field of computer vision technologies of artificial intelligence, and in particular, to a three-dimensional face model generation method and apparatus, a device, and a medium.

BACKGROUND

Three-dimensional (3D) face reconstruction is reconstruction of a 3D face model from one or more two-dimensional (2D) images.

Three-dimensional face reconstruction may be implemented after performing fitting based on a three-dimensional face model of a target object obtained from an image and a standard face model in a three-dimensional morphable model (3DMM) library. A point in low-model point cloud (the standard face model) is pulled to a location corresponding to high-model point cloud (the three-dimensional face model of the target object) based on a correspondence between points in the two models by using a deformation transfer (DT) technology. Other points are obtained by performing fitting on smooth items.

In these situations, a surface of a three-dimensional face model obtained by performing fitting based on the 3DMM library may not be smooth enough or then is of relatively lower quality.

SUMMARY

Embodiments of the present disclosure provide a three-dimensional face model generation method and apparatus, a device, and a medium, to improve quality of a three-dimensional face model obtained through fitting. The technical solutions are as follows.

In one aspect, the present disclosure provides a three-dimensional face model generation method, applied to a computing device. The method includes: obtaining an inputted three-dimensional face mesh of a target object; aligning the three-dimensional face mesh with a first three-dimensional face model of a standard object according to face keypoints; performing fitting on the three-dimensional face mesh and a local area of the first three-dimensional face model, to obtain a second three-dimensional face model after local fitting; and performing fitting on the three-dimensional face mesh and a global area of the second three-dimensional face model, to obtain a three-dimensional face model of the target object after global fitting.

In another aspect, the present disclosure provides a three-dimensional face model generation apparatus, the apparatus including a memory storing computer program instructions; and a processor coupled to the memory and configured to execute the computer program instructions and perform: obtaining a three-dimensional face mesh of a target object; aligning the three-dimensional face mesh with a first three-dimensional face model of a standard object according to face keypoints; and performing fitting on the three-dimensional face mesh and a local area of the first three-dimensional face model, to obtain a second three-dimensional face model after local fitting; and performing fitting on the three-dimensional face mesh and a global area of the second three-dimensional face model, to obtain a three-dimensional face model of the target object after global fitting.

In yet another aspect, the present disclosure provides a non-transitory computer-readable storage medium storing computer program instructions executable by at least one processor to perform: obtaining a three-dimensional face mesh of a target object; aligning the three-dimensional face mesh with a first three-dimensional face model of a standard object according to face keypoints; performing fitting on the three-dimensional face mesh and a local area of the first three-dimensional face model, to obtain a second three-dimensional face model after local fitting; and performing fitting on the three-dimensional face mesh and a global area of the second three-dimensional face model, to obtain a three-dimensional face model of the target object after global fitting.

Other aspects of the present disclosure can be understood by those skilled in the art in light of the description, the claims, and the drawings of the present disclosure.

The technical solutions provided in the embodiments of the present disclosure may produce one or more of the following beneficial effects:

First, the three-dimensional face mesh is aligned with a first three-dimensional face model corresponding to a standard object according to face keypoints. Then, fitting is performed on the three-dimensional face mesh and a local area of the first three-dimensional face model, to obtain a second three-dimensional face model after local fitting. Then, fitting is performed on the three-dimensional face mesh and a global area of the second three-dimensional face model, to obtain a three-dimensional face model of the target object after global fitting. Fitting is performed on the three-dimensional face mesh and the local area of the first three-dimensional face model with a smaller quantity of keypoints, to form the second three-dimensional face model with a larger quantity of keypoints. Fitting is further performed based on the second three-dimensional face model, so that the generated three-dimensional face model of the target object is closer to the target object.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
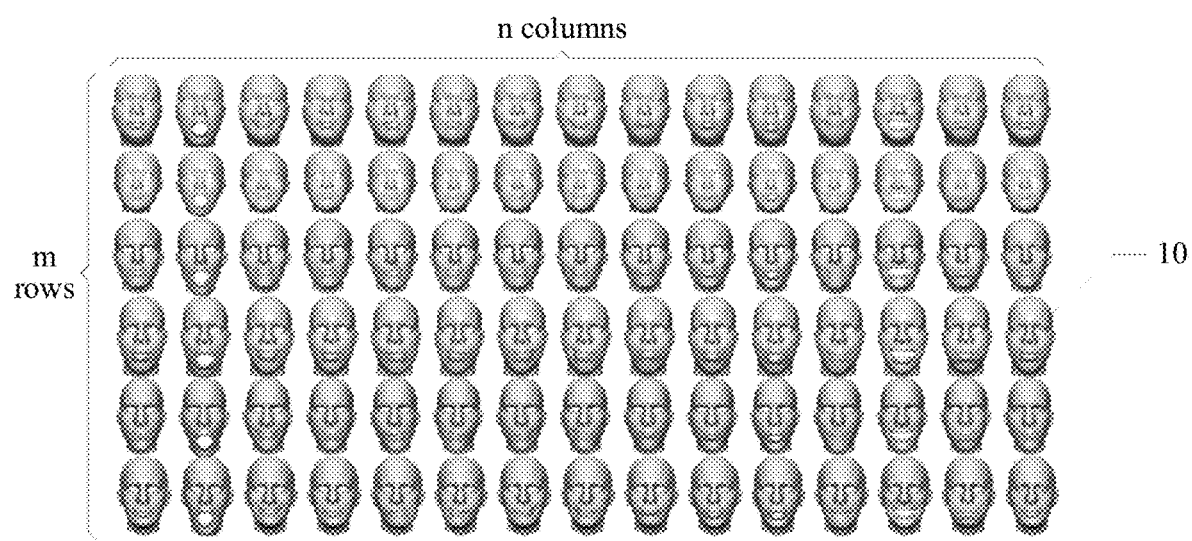
FIG. 1 is a schematic diagram of a bilinear 3DMM library according to one or more embodiments of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

First, terms involved in the embodiments of the present disclosure are introduced:

Artificial Intelligence (AI) is a theory, method, technology, and implementation system that use a digital computer or a machine controlled by a digital computer to simulate, extend, and expand human intelligence, perceive the environment, obtain knowledge, and use the knowledge to obtain the best result. In other words, AI is a comprehensive technology of computer science, which attempts to understand essence of intelligence and produces a new intelligent machine that responds in a manner similar to human intelligence. AI is to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. An AI software technology may include fields such as a CV technology, a speech processing technology, a natural language processing technology, and machine learning/deep learning (DL).

With the research and progress of AI technologies, the AI technologies have been researched and applied in many fields such as common smart home, smart wearable device, virtual assistant, smart speaker, smart marketing, unmanned driving, automatic driving, unmanned aerial vehicle, robot, smart medical care, smart customer service, face recognition, and three-dimensional face model reconstruction. It is believed that with the development of technology, the AI technologies will be applied in more fields and play an increasingly important role.

Solutions provided in the embodiments of the present disclosure relate to the field of 3D face reconstruction technologies. Fitting is performed on a three-dimensional face mesh and a standard face model that corresponds to a standard object, to generate a three-dimensional face model of a target object, and a group of expression bases of the target object are generated based on the three-dimensional face model.

Computer vision (CV) is a science that studies how to enable a machine to "see", and to be specific, to implement machine vision such as recognition, tracking, measurement, and the like for a target by using a camera and a computer in replacement of human eyes, and further perform graphic processing, so that the computer processes the target into an image more suitable for human eyes to observe, or more suitable to be transmitted to an instrument for detection. As a scientific subject, the CV studies related theories and technologies, and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

A three-dimensional morphable model (3DMM) library includes two parts: expression bases and shape bases. The 3DMM library is in a linear or bilinear form. FIG. 1 is a schematic diagram of a typical bilinear 3DMM library 10. Each row is the same person. There are a total of m persons, and therefore there are m rows (m different shapes). Each column in each row corresponds to different expressions. There are a total of n expressions, and therefore there are n columns.

Once the 3DMM library shown in FIG. 1 is provided, the 3DMM library may provide a parametric representation for a face of any shape with any expression. There is the following formula:

$$M = \exp \times Cr \times id$$

Cr is the 3DMM library and has a dimension n×k×m. k is a quantity of point cloud of a single face, n is a quantity of expressions, and m is a shape base (or referred to as a "face reconstruction base"). exp is an expression coefficient and has a dimension 1×n. id is a shape coefficient and has a dimension m×1. n, m, and k are all positive integers.

Figure 2:
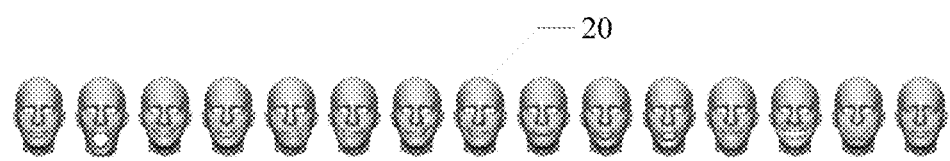
FIG. 2 is a schematic diagram of a group of expression bases according to one or more embodiments of the present disclosure.

As can be seen from the formula 1, a parametric representation of any face may be id+exp, where id of a person is fixed. Therefore, a group of expression bases (also referred to as blendshape) dedicated to this person may be derived, as shown in FIG. 2. Obviously, when there are such a group of expression bases 20 of this person, this person may be driven by using an expression coefficient, and a three-dimensional face model of this person with any expression may be generated by changing the expression coefficient.

Figure 3:
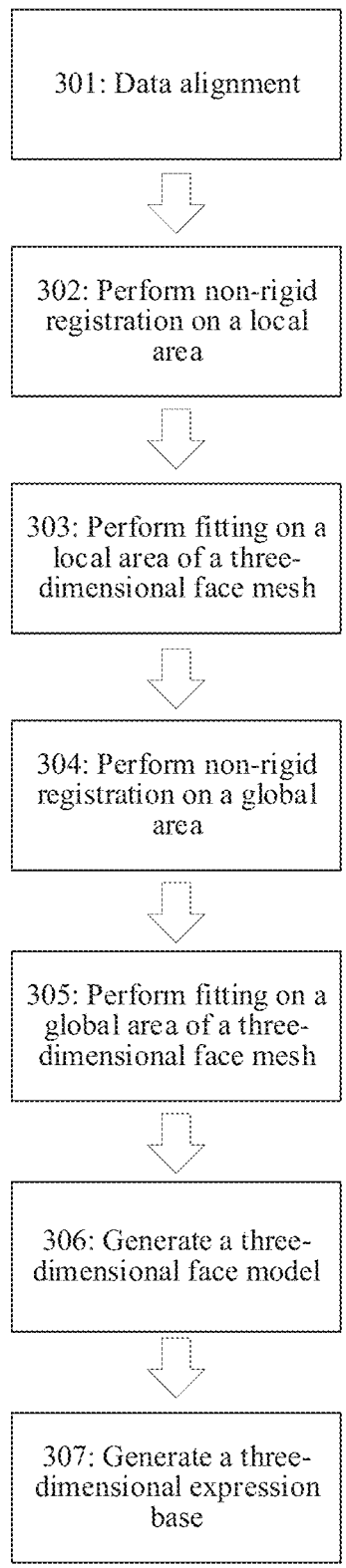
FIG. 3 is a schematic framework diagram of a procedure in a technical solution according to one or more embodiments of the present disclosure.

FIG. 3 is a framework diagram of a procedure according to an exemplary embodiment of the present disclosure. A method provided in this embodiment of the present disclosure is applied to a process of generating a three-dimensional face model of a target object and generating a group of expression bases of the target object. The process includes: 301: Align three-dimensional data of a three-dimensional face mesh with three-dimensional data of a standard face model corresponding to a standard object, that is, convert the three-dimensional face mesh and the standard face model to the same coordinate system. 302: Perform non-rigid registration on a local area of the aligned standard face model and a local area corresponding to the three-dimensional face mesh. 303: After non-rigid registration, perform fitting on the local area of the standard face model and the local area corresponding to the three-dimensional face mesh. 304: Perform non-rigid registration on a global area of a three-dimensional face model after first time of fitting and a global area of the three-dimensional face mesh. 305: After non-rigid registration, perform fitting on the global area of the three-dimensional face model and the global area of the three-dimensional face mesh. 306: Generate a three-dimensional face model of a target object. 307: Generate a group of three-dimensional expression bases of the target object based on the three-dimensional face model.

Figure 4:
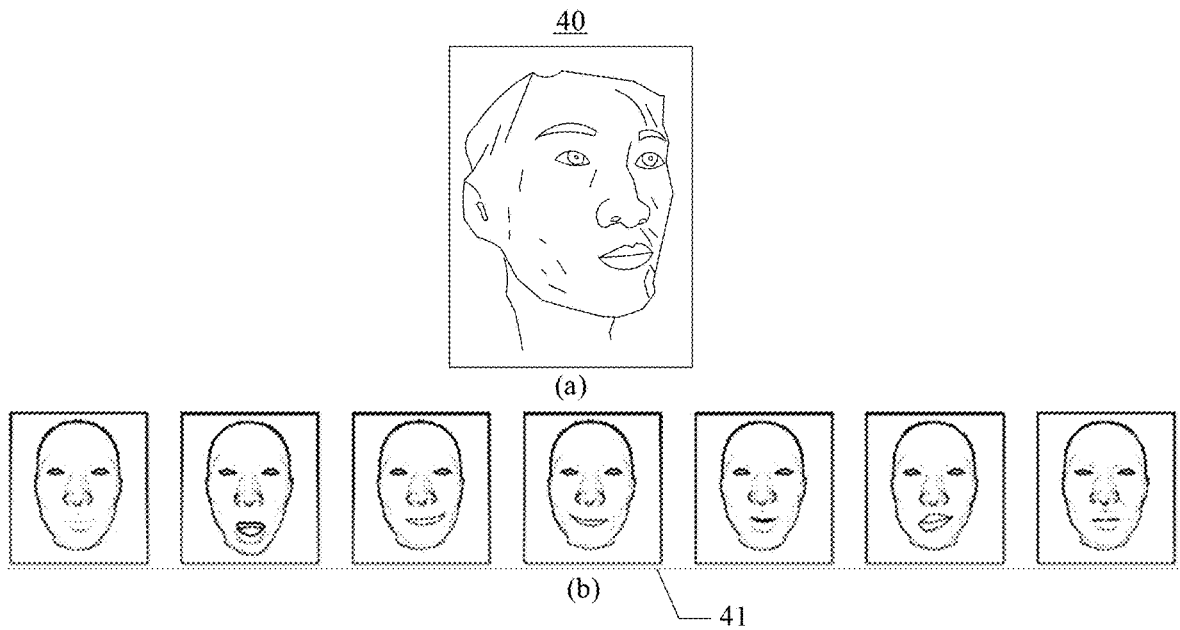
FIG. 4 is a schematic diagram of a three-dimensional face model and generated three-dimensional expression bases according to one or more embodiments of the present disclosure.

After the group of expression bases of the target object are generated, the group of expression bases may be driven to generate the three-dimensional face model of the target object with any expression, to perform different product functions. For example, the technical solution provided in the present disclosure may be applied to a scenario such as an augmented reality (AR) expression used in a game or a social application program. In an example, a user uses an application program that supports three-dimensional face reconstruction in a smartphone. The application program calls a camera of the smartphone to scan the face of the user, generates a three-dimensional face model of the user based on a scanned image, and generates a group of drivable three-dimensional expression bases of the user. Three-dimensional face models for different expressions may be switched by driving the group of expression bases, to perform a corresponding function. As shown in (b) of FIG. 4, a group of expression bases 41 include a plurality of expressions of a three-dimensional face model.

Fitting performed on the standard face model in the 3DMM library and the three-dimensional face mesh may be implemented by using a deformation transfer technology. A group of standard expression bases are generated in the 3DMM library in advance. An inputted face model (that is, the three-dimensional face mesh or a high model, namely, a model with a larger quantity of keypoints) of any topology is aligned with each standard expression base (the standard face model or a low model, namely, a model with a smaller quantity of keypoints), to generate a group of expression bases of this person. In the deformation transfer technology, the standard face model is pulled to a corresponding location of the three-dimensional face mesh based on a correspondence, and other points of the three-dimensional face mesh correspond to a smoothing operation. In an actual operation, noise of the three-dimensional face mesh is larger. As shown in (a) of FIG. 4, the surface of the three-dimensional face mesh 40 is not smooth or has some flaws. As a result, the generated three-dimensional face model of the target object also has flaws. Especially, complex parts of the target object such as mouth and nose are prone to flaws. Therefore, the generated three-dimensional face model does not look like the face of the target object or distorts. To improve quality of the generated three-dimensional face model, a high-quality correspondence is used in the above process, and the high-quality correspondence may need to be manually calibrated.

The embodiments of the present disclosure provide a method. Based on the idea of coarse to fine (CTF), non-rigid deformation (NRD) is combined with vertex fit (VF), after the standard face model is aligned with the three-dimensional face mesh, fitting is performed on the three-dimensional face mesh and a local area of the standard face model once, and then fitting is performed on the three-dimensional face mesh and a global area of the standard face model again, so that corresponding expression bases basically conforming to expressions of the target object may be derived from the generated three-dimensional face model even in extreme situations.

Steps of the procedure of the method provided in the embodiments of the present disclosure may be executed by a terminal such as a mobile phone, a tablet computer, a desktop computer, a notebook computer, a multimedia playback device, or a wearable device, or may be executed by a server. For ease of description, for example, each step is executed by a computing device in method embodiments below. In certain embodiments, the computing device may be any electronic device with a capability of computing and storage, such as a terminal or a server.

Figure 5:
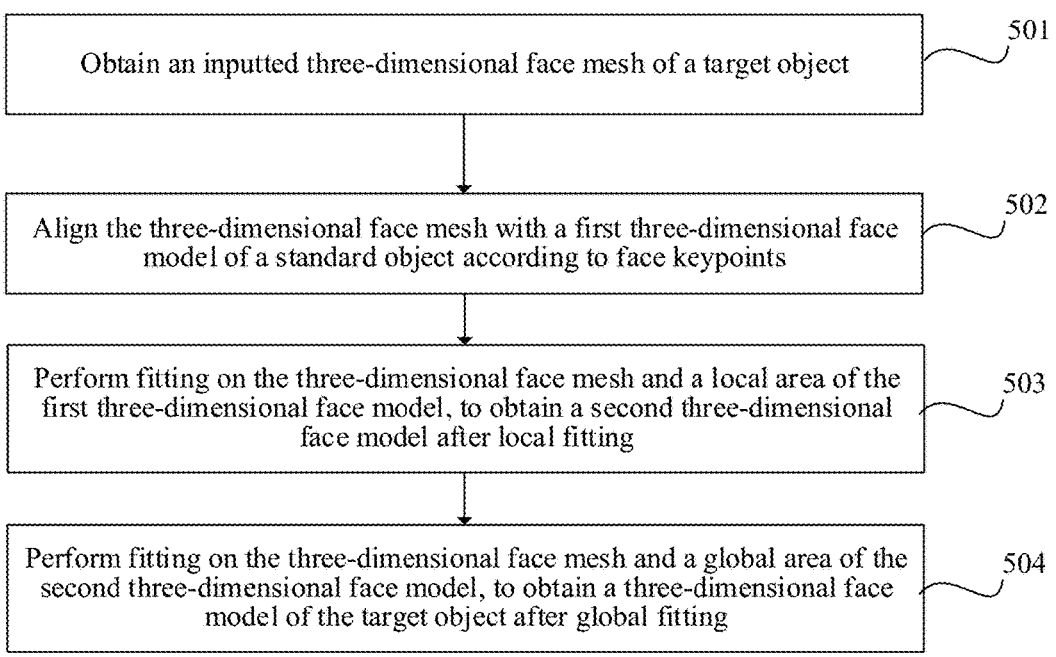
FIG. 5 is a schematic flowchart of a three-dimensional face model generation method according to one or more embodiments of the present disclosure.

FIG. 5 is a flowchart of a three-dimensional face model generation method according to an exemplary embodiment of the present disclosure. The method may be applied to the computing device. The method includes the following steps:

Step 501: Obtain an inputted three-dimensional face mesh of a target object.

The three-dimensional face mesh (Mesh) means that a set of vertices and polygons of polyhedrons is used to describe three-dimensional data of a face of the target object, where the polygon is at least one of a triangle, a quadrilateral, or other simple convex polygons, to simplify a rendering process. In certain embodiments, the three-dimensional face mesh may also include three-dimensional data formed by ordinary polygons with holes. This is not limited in the present disclosure. The three-dimensional face mesh is suitable for transformations such as rotation, translation, scaling, and affine transformation. In this embodiment of the present disclosure, the three-dimensional face mesh is equivalent to a model with many points (a high model).

In certain embodiments, the computing device may capture images of the target object by shooting or in some instance continuously shooting around the face (or the entire head) of the target object through an image capturing device. The image capturing device is a device that may shoot a color image and a depth image. Continuous shooting is shooting images or videos at a preset frequency. Illustratively, the computing device inputs captured images of the target object into a model to obtain the three-dimensional face mesh of the target object. The model is a machine learning model with a capability of dividing the three-dimensional face mesh. In certain embodiments, the images captured by the computing device include images of a plurality of viewing angles of the target object such as a front-face posture image, a side-face posture image, a look-up posture image, and an overlook posture image.

Step 502: Align the three-dimensional face mesh with a first three-dimensional face model of a standard object according to face keypoints.

The face keypoints are keypoints on the face of the target object. In certain embodiments, the face keypoints include at least one of keypoints corresponding to the eyes, a keypoint corresponding to the nose, a keypoint corresponding to the mouth, keypoints corresponding to the eyebrows, and a keypoint corresponding to the chin. In certain embodiments, the face keypoints of the three-dimensional face mesh are obtained by using a keypoint detection technology. In an example, the keypoint detection technology may be obtained by inputting the three-dimensional face mesh into a model. The model is a machine learning model that supports detection of coordinates of a keypoint. Illustratively, the model outputs coordinates of a keypoint on the three-dimensional face mesh.

The first three-dimensional face model is any one of standard three-dimensional face models in a 3DMM library. In this embodiment of the present disclosure, a quantity of keypoints of the first three-dimensional face model is less than that of a second three-dimensional face model. The first three-dimensional face model is a model that exists before being fitted with the three-dimensional face mesh.

Figure 6:
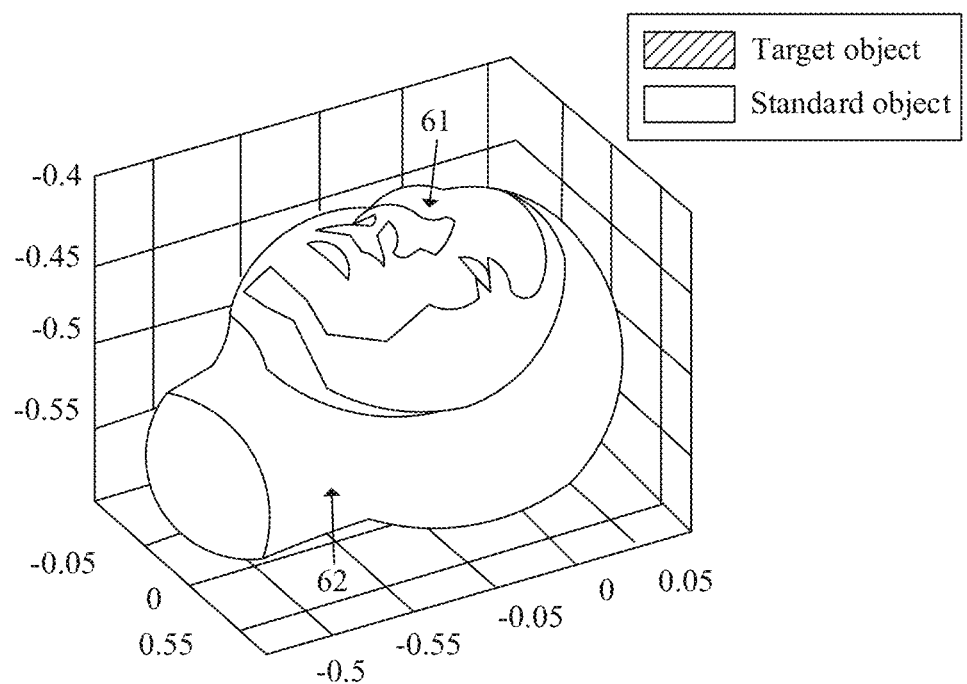
FIG. 6 is a schematic diagram of aligning a three-dimensional face mesh with a first three-dimensional face model according to one or more embodiments of the present disclosure.

Alignment means converting the three-dimensional face mesh and the first three-dimensional face model of the standard object to the same rectangular coordinate system. FIG. 6 is a diagram of an effect achieved after the three-dimensional face mesh 61 corresponding to the target object is aligned with the standard face model 62 (that is, the first three-dimensional face model) corresponding to the standard object. Because the three-dimensional face mesh 61 and the standard face model 62 are not exactly the same, the three-dimensional face mesh 61 may not be completely aligned with the standard face model 62. In step 502, the three-dimensional face mesh 61 is preliminarily aligned with the standard face model 62.

In certain embodiments, the computing device may align the three-dimensional face mesh with the first three-dimensional face model according to the face keypoints or according to a coordinate system of a model. For example, a coordinate system of the first three-dimensional face model is used as the reference, and the three-dimensional face mesh of the target object is aligned according to a specific point or a specific line in the coordinate system.

Step 503: Perform fitting on the three-dimensional face mesh and a local area of the first three-dimensional face model, to obtain a second three-dimensional face model after local fitting.

The local area is an area in which a fitting error rate is lower than a preset condition. For example, structures of a nose area and a mouth area of the first three-dimensional face model are complex multi-layered structures during fitting, and have a fitting error rate higher than the preset condition. Therefore, the nose area and the mouth area do not belong to the local area of the first three-dimensional face model.

In an example, the second three-dimensional face model after local fitting does not include the nose area and the mouth area, that is, fitting is not performed on the nose area and the mouth area in the second three-dimensional face model after local fitting.

Step 504: Perform fitting on the three-dimensional face mesh and a global area of the second three-dimensional face model, to obtain a three-dimensional face model of the target object after global fitting.

The quantity of keypoints of the second three-dimensional face model is higher than that of the first three-dimensional face model, and the second three-dimensional face model looks like the three-dimensional face mesh to a greater extent than the first three-dimensional face model. In this embodiment of the present disclosure, the second three-dimensional face model is generated after fitting is performed on the three-dimensional face mesh and the local area of the first three-dimensional face model.

In an example, the global area of the second three-dimensional face model includes complex areas including the nose area and the mouth area, that is, the three-dimensional face model of the target object is after fitting is performed on the second three-dimensional face model.

In the method provided in this embodiment, first, the three-dimensional face mesh is aligned with a first three-dimensional face model corresponding to a standard object according to face keypoints. Then, fitting is performed on the three-dimensional face mesh and a local area of the first three-dimensional face model, to obtain a second three-dimensional face model after local fitting. Then, fitting is performed on the three-dimensional face mesh and a global area of the second three-dimensional face model, to obtain a three-dimensional face model of the target object after global fitting. Fitting is performed on the three-dimensional face mesh and the local area of the first three-dimensional face model with a smaller quantity of keypoints, to form the second three-dimensional face model with a larger quantity of keypoints. Fitting is further performed based on the second three-dimensional face model, so that the generated three-dimensional face model of the target object is closer to the target object.

Figure 7:
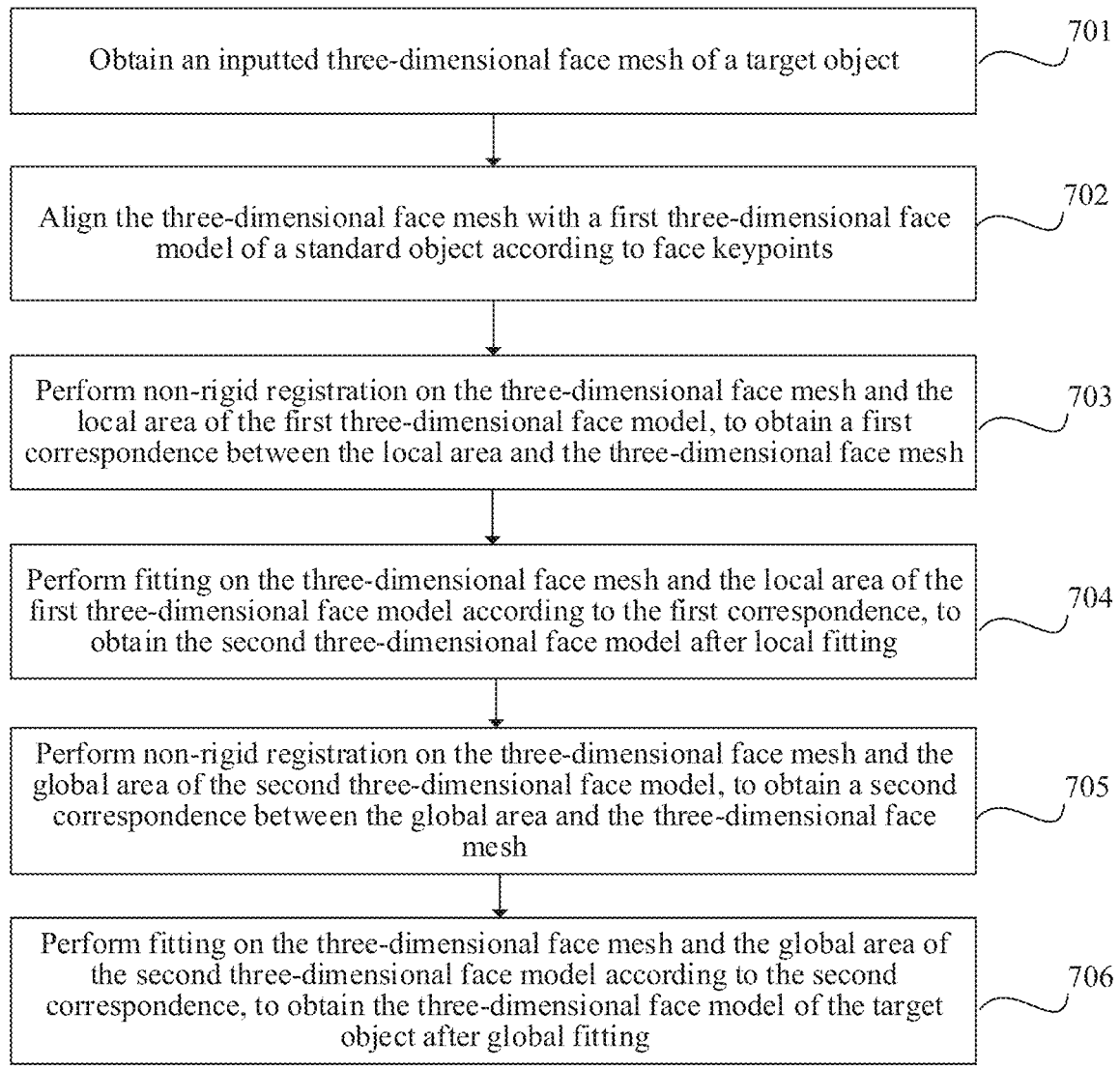
FIG. 7 is a schematic flowchart of a three-dimensional face model generation method according to one or more embodiments of the present disclosure.

FIG. 7 is a flowchart of a three-dimensional face model generation method according to an exemplary embodiment of the present disclosure. The method may be applied to the computing device, and includes the following steps:

Step 701: Obtain an inputted three-dimensional face mesh of a target object.

Step 701 is the same as step 501 shown in FIG. 5, and details are not described herein again.

Step 702: Align the three-dimensional face mesh with a first three-dimensional face model of a standard object according to face keypoints.

Figure 8:
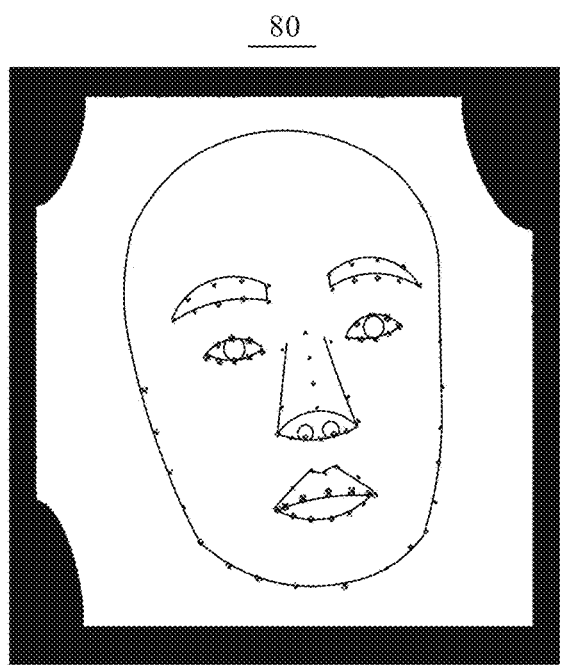
FIG. 8 is a schematic diagram of keypoints of a three-dimensional face mesh and keypoints of a first three-dimensional face model according to one or more embodiments of the present disclosure.
Figure 8:
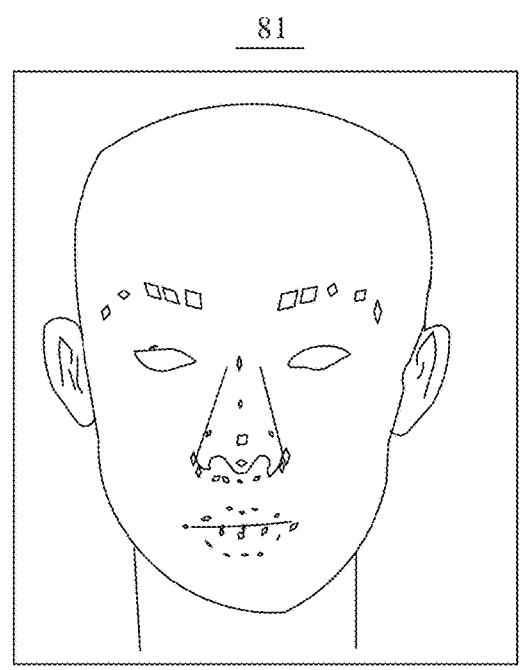

Illustratively, a keypoint of the three-dimensional face mesh is detected by using a keypoint detection technology. As shown in (a) of FIG. 8, a keypoint is detected on a three-dimensional face mesh 80 of the target object. Illustratively, keypoints of the three-dimensional face mesh 80 include keypoints corresponding to parts such as the eyebrows, the eyes, the nose (including the nostrils), the mouth, and the facial contour. As shown in (b) of FIG. 8, keypoints of a first three-dimensional face model 81 are marked in advance.

Because a keypoint of the three-dimensional face mesh and a keypoint of the first three-dimensional face model have the same meaning, alignment may be performed by using the following formula:

$$M_{low}=S\times(R\times M_{high}+T)$$

$M_{high}$ is a three-dimensional point corresponding to a keypoint of the three-dimensional face mesh, $M_{low}$ is a three-dimensional point corresponding to a keypoint of the first three-dimensional face model, S is a scaling parameter, R is a rotation matrix, and T is a translation parameter. Assuming that the three-dimensional face mesh and the first three-dimensional face model only have three transformations of rotation (R), translation (T), and scaling (S), three variables: rotation, translation, and scaling may be solved by using the formula.

Step 703: Perform non-rigid registration on the three-dimensional face mesh and the local area of the first three-dimensional face model, to obtain a first correspondence between the local area and the three-dimensional face mesh.

For a preliminary alignment, non-rigid registration may be performed on the three-dimensional face mesh and the local area of the first three-dimensional face model. Non-rigid registration (NRR, also referred to as non-rigid icp or nricp) means that when a high model is used as a target model and a low model is used as a source model, the source model is converted to the target model. The first correspondence is a correspondence between a point in the local area of the first three-dimensional face model and a point on the three-dimensional face mesh. In certain embodiments, a point of a model is a keypoint or a non-keypoint.

Figure 9:
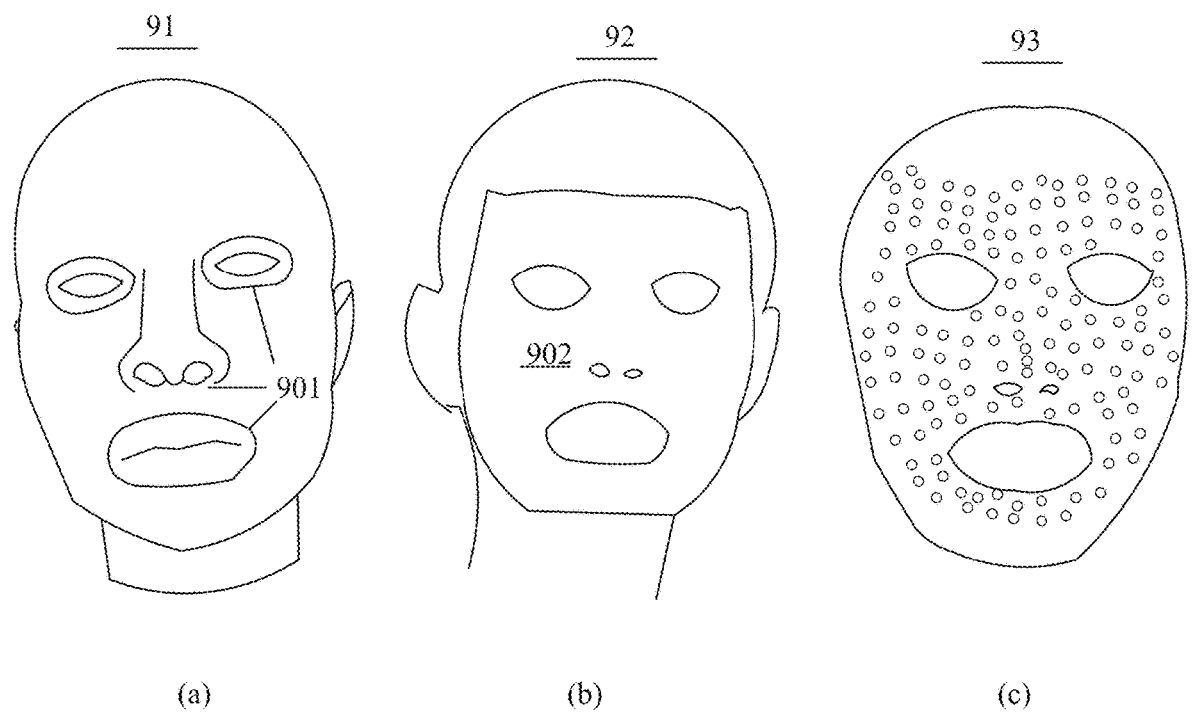
FIG. 9 is a schematic diagram of an area when non-rigid registration is performed on a global area of a second three-dimensional face model obtained through local fitting according to one or more embodiments of the present disclosure.

As shown in FIG. 9, (a) of FIG. 9 is a first three-dimensional face model 91 on which non-rigid registration is not performed. An area 901 is an area that does not belong to the local area, that is, is an area in which non-rigid registration is not performed. A point in the area 901 is an outlier. Illustratively, the area 91 includes the orbital area, the nostril area, and the mouth area. (b) of FIG. 9 is a first three-dimensional face model 92 on which rigid registration has been performed. An area 902 is the local area, that is, is an area in which non-rigid registration is performed. A point in the area 902 is an inlier. (c) of FIG. 9 is a first three-dimensional face model 93 on which non-rigid registration has been performed. The first correspondence between an inlier and the three-dimensional face mesh may be determined based on the first three-dimensional face model 93.

Step 704: Perform fitting on the three-dimensional face mesh and the local area of the first three-dimensional face model according to the first correspondence, to obtain the second three-dimensional face model after local fitting.

Figure 10:
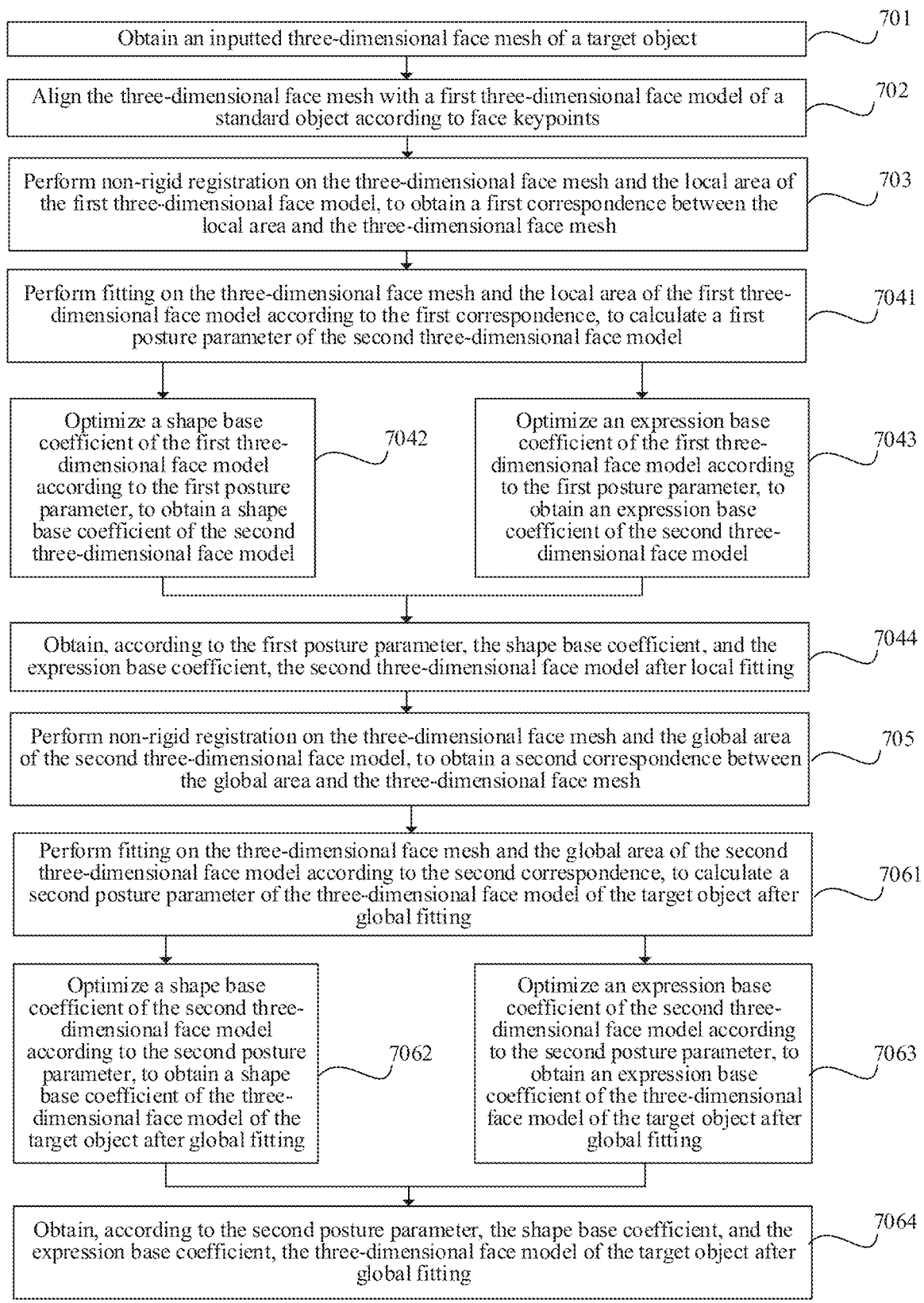
FIG. 10 is a schematic flowchart of a three-dimensional face model generation method according to one or more embodiments of the present disclosure.

Illustratively, as shown in FIG. 10, step 704 further includes the following step 7041 to step 7044:

Step 7041: Perform fitting on the three-dimensional face mesh and the local area of the first three-dimensional face model according to the first correspondence, to calculate a first posture parameter of the second three-dimensional face model.

The first posture parameter includes at least one of a rotation parameter, a translation parameter, and a scaling parameter. The first posture parameter is solved according to the formula corresponding to alignment of the three-dimensional face mesh with the first three-dimensional face model. During preliminary alignment, there are fewer corresponding keypoints of the three-dimensional face mesh and the first three-dimensional face model, and more corresponding keypoints may be obtained according to the first correspondence. Therefore, the calculated first posture parameter is closer to a posture parameter of the three-dimensional face mesh. Illustratively, during preliminary alignment, there are 106 corresponding keypoints of the three-dimensional face mesh and the first three-dimensional face model. Several thousands of corresponding keypoints or more are obtained according to the first correspondence.

Step 7042: Adjust a shape base coefficient of the first three-dimensional face model according to the first posture parameter, to obtain a shape base coefficient of the second three-dimensional face model.

A formula for adjusting the shape base coefficient is as follows:

$$f(id)=\min(s(R[(\exp\times Cr)\times id]+T)-M_{high})$$

An adjusted variable is a shape base coefficient id, s, R, and T are first posture parameters, s is a scaling parameter, R is a rotation matrix, T is a translation parameter, Cr is a 3DMM library, exp is an average value of standard face models in the current 3DMM library, and $M_{high}$ is a three-dimensional point corresponding to a keypoint of the three-dimensional face mesh. The adjusted variable corresponds to the first correspondence. A shape base coefficient of the second three-dimensional face model may be solved through Gauss-Newton iteration.

Step 7043: Adjust an expression base coefficient of the first three-dimensional face model according to the first posture parameter, to obtain an expression base coefficient of the second three-dimensional face model.

A formula for adjusting the expression base coefficient is as follows:

$$f(\exp)=\min(s(R[(id\times Cr)\times \exp]T)-M_{high})$$

An adjusted variable is an expression base coefficient exp, s, R, and T are first posture parameters, s is a scaling parameter, R is a rotation matrix, T is a translation parameter, Cr is a 3DMM library, exp is an average value of standard face models in the current 3DMM library, and $M_{high}$ is a three-dimensional point corresponding to a keypoint of the three-dimensional face mesh. The adjusted variable corresponds to the first correspondence. An expression base coefficient of the second three-dimensional face model may be solved through Gauss-Newton iteration.

Step 7044: Obtain, according to the first posture parameter, the shape base coefficient, and the expression base coefficient, the second three-dimensional face model after local fitting.

Through iteration of the above formula, the first posture parameter, the shape base coefficient, and the expression base coefficient may be adjusted and in certain instance, continuously adjusted, and the first posture parameter is closer to a posture parameter corresponding to the target object than the rotation parameter solved during the preliminary alignment.

Figure 11:
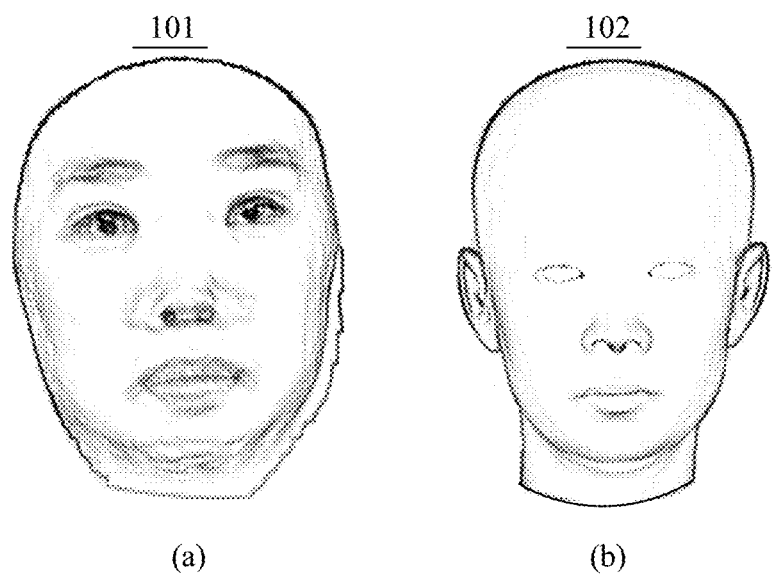
FIG. 11 is a schematic diagram of a second three-dimensional face model obtained through local fitting according to one or more embodiments of the present disclosure.

A calculated quantity of keypoints that may be used for fitting and that are of the second three-dimensional face model is greater than that of the first three-dimensional face model, that is, the second three-dimensional face model is closer to the target object than the first three-dimensional face model. As shown in FIG. 11, (a) of FIG. 11 is a three-dimensional face mesh 101 of the target object, and (b) of FIG. 11 is a second three-dimensional face model 102 after local fitting.

Step 705: Perform non-rigid registration on the three-dimensional face mesh and the global area of the second three-dimensional face model, to obtain a second correspondence between the global area and the three-dimensional face mesh.

Based on the second three-dimensional face model and the adjusted first posture parameter, shape base coefficient, and expression base coefficient, non-rigid registration may be performed on the second three-dimensional face model and the three-dimensional face mesh to a greater extent. Non-rigid registration is performed on areas, such as the nose area, the mouth area, and the orbital area that are of the first three-dimensional face model and in which non-rigid registration is not previously performed.

Figure 12:
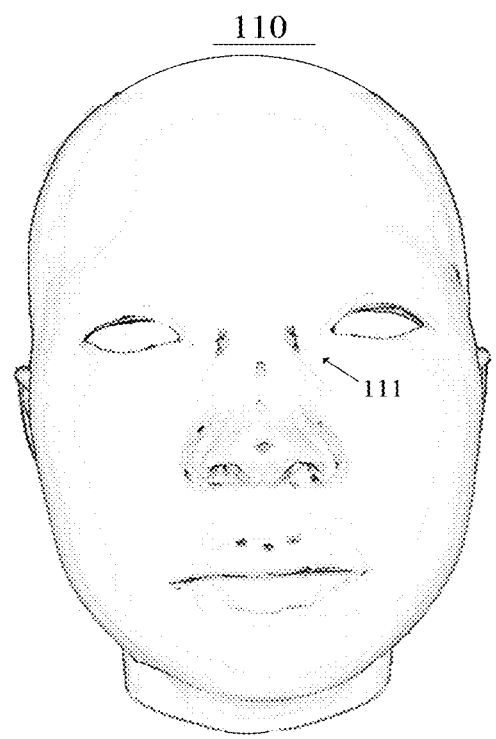
FIG. 12 is a schematic diagram of flaws of a second three-dimensional face model obtained through local fitting according to an exemplary embodiment of the present disclosure.

As shown in FIG. 12, the second three-dimensional face model 110 is closer to the target object than the first three-dimensional face model, and a flaw 111 is generated on the second three-dimensional face model 110. The flaw may need to be filtered out, so as not to affect a next step of fitting.

Filtering out the flaw includes the following steps:

S1: Obtain a flaw of the second three-dimensional face model, where the flaw corresponds to an outlier of the first three-dimensional face model, and the outlier is a point that does not belong to the local area of the first three-dimensional face model.

A point in the local area of the first three-dimensional face model is an inlier, and the outlier of the first three-dimensional face model is a point that does not belong to the local area of the first three-dimensional face model.

The obtaining a flaw of the second three-dimensional face model includes the following sub-steps:

S11: Compare a norm corresponding to the global area of the second three-dimensional face model with a norm corresponding to the second three-dimensional face model after local fitting, to obtain a norm difference.

S12: Determine the flaw of the second three-dimensional face model according to the norm difference.

Figure 13:
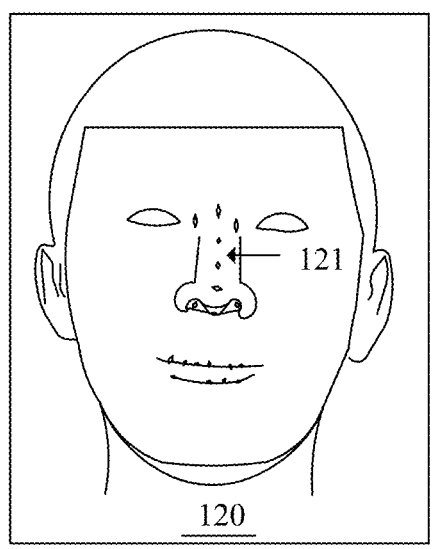
FIG. 13 is a schematic diagram of determining flaws of a second three-dimensional face model obtained through local fitting according to one or more embodiments of the present disclosure.

The flaw is caused because a topology structure of the second three-dimensional face model after local fitting is inconsistent with that of the three-dimensional face mesh. Therefore, a norm of the flaw is incorrect, and the flaw, that is, an outlier is detected based on the norm. As shown in FIG. 13, a flaw 121 of a second three-dimensional face model 120 is detected based on a norm.

S2: Filter out the flaw from the second three-dimensional face model, to obtain a second three-dimensional face model that is flawless.

Step 706: Perform fitting on the three-dimensional face mesh and the global area of the second three-dimensional face model according to the second correspondence, to obtain the three-dimensional face model of the target object after global fitting.

As shown in FIG. 10, step 706 further includes the following step 7061 to step 7064.

Step 7061: Perform fitting on the three-dimensional face mesh and the global area of the second three-dimensional face model according to the second correspondence, to calculate a second posture parameter of the three-dimensional face model of the target object after global fitting.

A method and a formula used in step 7061 are the same as those in step 7041. The second correspondence includes more correspondences, that is, more points may be used for the fitting process, for example, points in areas such as the nostril area, the mouth area, and the orbital area.

Step 7062: Adjust a shape base coefficient of the second three-dimensional face model according to the second posture parameter, to obtain a shape base coefficient of the three-dimensional face model of the target object after global fitting.

A method and a formula used in step 7062 are the same as those in step 7042. Details are not described herein again.

Step 7063: Adjust an expression base coefficient of the second three-dimensional face model according to the second posture parameter, to obtain an expression base coefficient of the three-dimensional face model of the target object after global fitting.

A method and a formula used in step 7063 are the same as those in step 7043. Details are not described herein again.

Step 7064: Obtain, according to the second posture parameter, the shape base coefficient, and the expression base coefficient, the three-dimensional face model of the target object after global fitting.

An expression base coefficient and a shape base coefficient corresponding to the target object may be obtained based on the three-dimensional face model of the target object after global fitting.

In certain embodiments, a shape base coefficient and an expression base coefficient of the three-dimensional face model of the target object after global fitting are obtained; and a three-dimensional expression base of the target object is generated according to the shape base coefficient and the expression base coefficient.

A formula for generating an expression base of the target object is as follows:

$$M = (Cr \times id) \times \exp$$

Cr is the 3DMM library and has a dimension n×k×m. k is a quantity of point cloud of a single face, n is a quantity of expressions, and m is a shape base (or referred to as a "pinch face base"). exp is an expression coefficient and has a dimension 1×n. id is a shape coefficient and has a dimension m×1. n, m, and k are all positive integers.

When the 3DMM library and the shape base coefficient are constant, as any expression base coefficient is provided, a three-dimensional face mesh of an expression may be obtained. Each single dimension of the expression base coefficient is set to 1, so that a group of three-dimensional expression bases may be separated. The group of three-dimensional expression bases are similar to the target object.

The 3DMM library is in any mode such as a linear mode. The posture parameter, the expression base coefficient, and the shape base coefficient are calculated by using any method. A correspondence between the three-dimensional face mesh and the standard face model in the 3DMM library is extracted by using any method.

In summary, in the method provided in this embodiment, the three-dimensional face mesh is aligned with the first three-dimensional face model of the standard object, non-rigid registration is performed on the three-dimensional face mesh and the local area of the first three-dimensional face model to obtain the first correspondence, fitting is performed on the three-dimensional face mesh and the local area of the first three-dimensional face model according to the first correspondence, to obtain the second three-dimensional face model after local fitting, and non-rigid registration and fitting processes are also performed on the three-dimensional face mesh and the second three-dimensional face model, to obtain the three-dimensional face model of the target object after global fitting. Through step-by-step fitting, the three-dimensional face model is closer to the three-dimensional face mesh. Therefore, the three-dimensional face model of the target object after global fitting is closer to the target object, and the generated three-dimensional expression base is closer to an expression of the target object.

Figure 14:
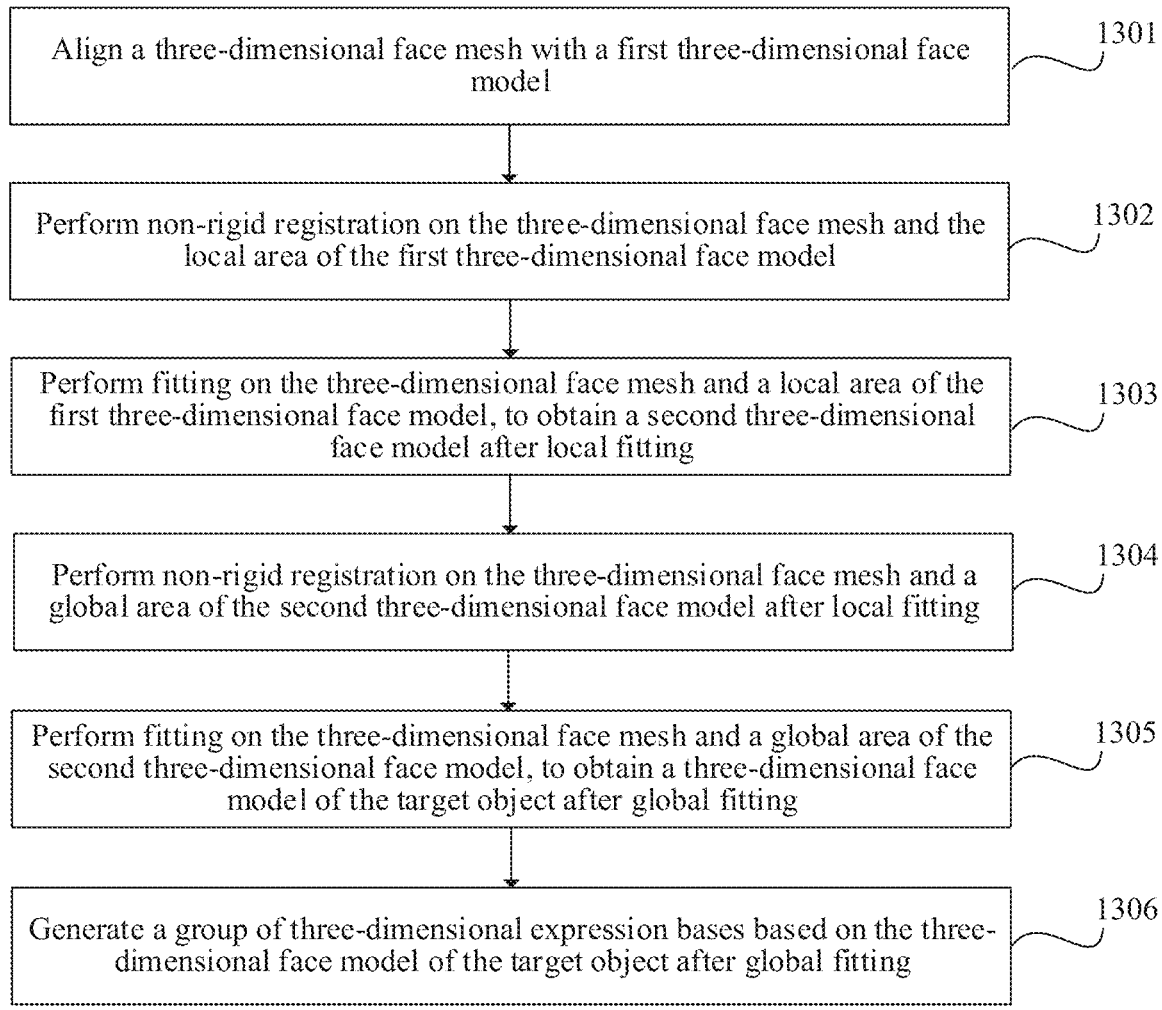
FIG. 14 is a schematic flowchart of a three-dimensional face model generation method according to one or more embodiments of the present disclosure.

FIG. 14 is a flowchart of a three-dimensional face model generation method according to an exemplary embodiment of the present disclosure. The method may be applied to the computing device, and includes the following steps:

Step 1301: Align a three-dimensional face mesh with a first three-dimensional face model.

The three-dimensional face mesh and the first three-dimensional face model (that is, a standard face model in a 3DMM library) are not in the same coordinate system, and have different center-point locations and sizes. Non-rigid registration cannot be performed on the three-dimensional face mesh and the first three-dimensional face model, and the three-dimensional face mesh may need to be preliminarily aligned with the first three-dimensional face model. In certain embodiments, a keypoint of the three-dimensional face mesh is detected based on another model or marked in advance, and a keypoint of the first three-dimensional face model is marked in advance. In certain embodiments, a first posture parameter of the first three-dimensional face model is solved by using a least square algorithm. The first posture parameter includes at least one of a rotation parameter, a translation parameter, and a scaling parameter. The three-dimensional face mesh and the first three-dimensional face model are converted to the same coordinate system based on the first posture parameter. From a course alignment to a fine alignment, fitting is performed on a local area of the first three-dimensional face model.

Step 1302: Perform non-rigid registration on the three-dimensional face mesh and the local area of the first three-dimensional face model.

A procedure of non-rigid registration is as follows:

Course matching step: course matching is performed on a source model and a target model.

Inlier matching step: a point that is in a corresponding location of the target model and that is closest to an inlier of the source model is determined for matching.

Outlier smoothing step: constraint is established based on matching in the inlier matching step, and an outlier is constrained by smoothing.

Iteration step: the inlier matching step and the outlier smoothing step are iterated, while a weight corresponding to a smooth item is reduced, or in some instance, continuously reduced, until convergence.

The non-rigid registration is affected by an initial value (the closest point determined in the inlier matching step). If the initial value is inaccurate (for example, the nose of the three-dimensional face mesh is aligned with the eyes of the first three-dimensional face model), calculation of a shape base coefficient and an expression base coefficient is affected. Besides, because complex areas such as a nose area and a mouth area of the first three-dimensional face model are multi-layered structures, when non-rigid registration is performed for the first time, fitting is performed only on an inlier in a local area. The local area is an area in which an error rate is lower than a preset condition. For example, the area does not include the complex areas such as the nose area and the mouth area.

Step 1303: Perform fitting on the three-dimensional face mesh and a local area of the first three-dimensional face model, to obtain a second three-dimensional face model after local fitting.

A procedure of fitting is as follows:

Initial step: an initial shape base coefficient and an initial expression base coefficient are set to average values in a 3DMM library.

Step for calculating a first posture parameter: the second three-dimensional face model is calculated by fixedly using a current shape base coefficient and a current expression base coefficient, and the first posture parameter is calculated according to a first correspondence.

Step for adjusting the shape base coefficient: the expression base coefficient is fixed, and the shape base coefficient is adjusted by using a current first posture parameter.

Step for adjusting the expression base coefficient: the shape base coefficient is fixed, and the expression base coefficient is adjusted by using a current first posture parameter.

Iteration step: the step for calculating a first posture parameter, the step for adjusting the shape base coefficient, and the step for adjusting the expression base coefficient are iterated until convergence.

The second three-dimensional face model obtained in the step is closer to the face of the target object than the first three-dimensional face model.

Step 1304: Perform non-rigid registration on the three-dimensional face mesh and a global area of the second three-dimensional face model after local fitting.

A correspondence obtained through non-rigid registration is more accurate. Fitting is performed on a standard face model in the 3DMM library according to the correspondence. The standard face model corresponds to a shape base coefficient and an expression base coefficient. This is also equivalent to performing fitting on the shape base coefficient and the expression base coefficient according to the correspondence. Therefore, it can be ensured that an outputted three-dimensional face model is a face model of a person even in extreme situations.

After non-rigid registration is performed on the three-dimensional face mesh and the global area of the second three-dimensional face model obtained after local fitting, a norm of the second three-dimensional face model after local fitting is compared with that of the three-dimensional face mesh. Because the second three-dimensional face model after local fitting does not include a damaged area, that is, the norm is more accurate, most outliers of the second three-dimensional face model after local fitting may be located by comparing the norms.

Step 1305: Perform fitting on the three-dimensional face mesh and a global area of the second three-dimensional face model, to obtain a three-dimensional face model of the target object after global fitting.

This step is consistent with step 1303, except that a second correspondence used in this step includes more correspondences, for example, a nostril area, a mouth area, and an orbital area that are lost after local fitting.

Step 1306: Generate a group of three-dimensional expression bases based on the three-dimensional face model of the target object after global fitting.

In the method provided in this embodiment, the first three-dimensional face model is first aligned with the three-dimensional face mesh from a course alignment to a fine alignment, non-rigid registration and fitting are then performed on the three-dimensional face mesh and the local area of the first three-dimensional face model, to obtain the second three-dimensional face model that is closer to the face of the target object, non-rigid registration and fitting are then performed on the three-dimensional face mesh and the global area of the second three-dimensional face model, to obtain the three-dimensional face model of the target object after global fitting, and the group of three-dimensional expression bases are generated based on the three-dimensional face model after global fitting. The three-dimensional face model and the three-dimensional expression bases generated based on this method are robust, and are closer to the face and the expression of the target object.

Implementation to a voice interaction scenario is used as an example below to introduce the technical solutions of the present disclosure.

Figure 15:
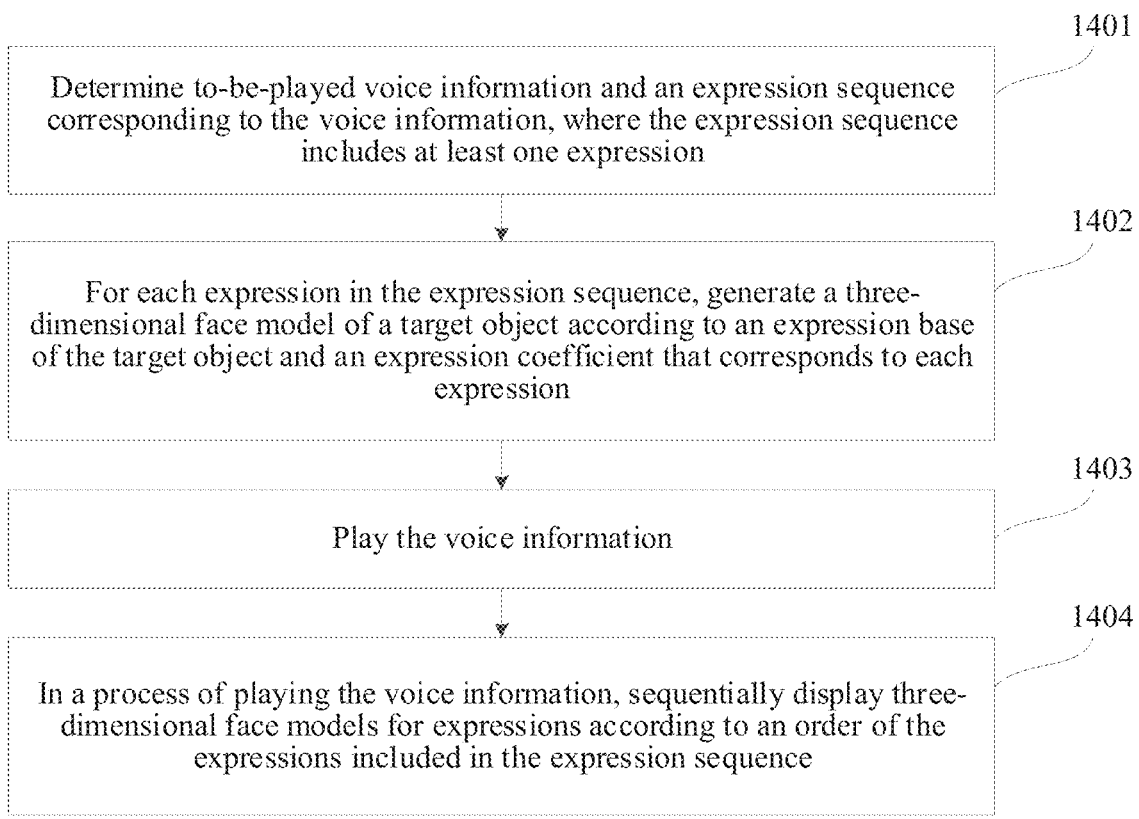
FIG. 15 is a schematic flowchart of a voice interaction method according to one or more embodiments of the present disclosure.

FIG. 15 is a flowchart of a voice interaction method according to an embodiment of the present disclosure. This method may be executed by a terminal such as a mobile phone, a tablet computer, or a wearable device. The method may include the following steps:

Step 1401: Determine to-be-played voice information and an expression sequence corresponding to the voice information, where the expression sequence includes at least one expression. The term "to-be-played voice information" may be referred to as "voice information."

A mapping relationship between the voice information and the expression sequence may be stored in advance. After the to-be-played voice information is determined, the expression sequence corresponding to the voice information may be found according to the mapping relationship. For example, a mapping relationship between each pronunciation and an expression may be stored. After the to-be-played voice information is determined, a pronunciation sequence corresponding to the voice information may be determined. The pronunciation sequence includes at least one pronunciation sequentially sorted. An expression corresponding to each pronunciation may be obtained, to obtain the expression sequence corresponding to the voice information.

Step 1402: For each expression in the expression sequence, generate a three-dimensional face model of a target object according to an expression base of the target object and an expression coefficient that corresponds to each expression.

Generation of a target expression of the target object is used as an example. A target expression coefficient corresponding to the target expression is determined. Then, a three-dimensional face model of the target object with the target expression is generated according to the target expression coefficient and the group of expression bases of the target object.

In certain embodiments, a three-dimensional face model for each expression is rendered by using a texture map of the target object, to obtain a three-dimensional face model with texture for each expression.

In certain embodiments, a group of expression bases of the target object are generated in the following manner: photographing image pairs for n head postures of the target object, where each image pair includes an RGB image and a depth image for each head posture, and n is a positive integer; and a group of expression bases of the target object are generated according to the n image pairs. For a process of generating the expression bases, refer to descriptions in the embodiments, which are not repeated in this embodiment.

Step 1403: Play the voice information.

Step 1404: In a process of playing the voice information, sequentially display three-dimensional face models for expressions according to an order of the expressions included in the expression sequence.

In certain embodiments, in a process of playing the voice information, the three-dimensional face models with texture for the expressions are sequentially displayed according to the order of the expressions included in the expression sequence.

In the technical solution provided in this embodiment of the present disclosure, the expression sequence corresponding to the to-be-played voice information is determined, the three-dimensional face model of the target object with each expression is generated according to the expression base of the target object and the expression coefficient that corresponds to each expression, and in a process of playing the voice information, the three-dimensional face models for the expressions are sequentially displayed according to the order of the expressions included in the expression sequence. Therefore, the voice interaction solution based on the model obtained through three-dimensional face reconstruction is implemented, and a matched expression may be displayed according to voice played in real time, which is more vivid.

The following is an apparatus embodiment of the present disclosure. For details that are not described in the apparatus embodiment, refer to corresponding records in the method embodiments. Details are not described herein again.

Figure 16:
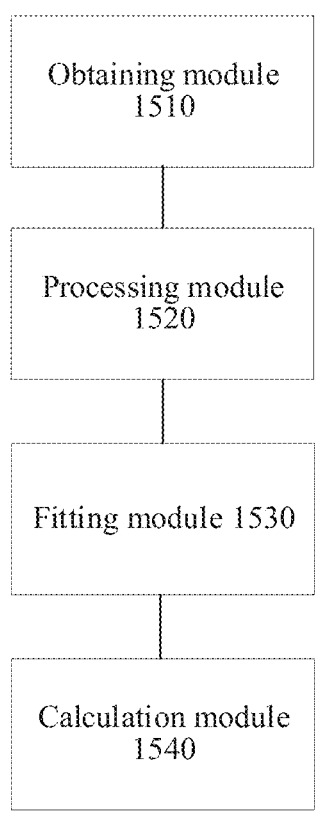
FIG. 16 is a schematic block diagram of a three-dimensional face model generation apparatus according to one or more embodiments of the present disclosure.

FIG. 16 is a schematic structural diagram of a three-dimensional face model generation apparatus according to an exemplary embodiment of the present disclosure. The apparatus may be implemented as the entirety or a part of a terminal through software, hardware, or a combination thereof. The apparatus includes: an obtaining module 1510, configured to obtain an inputted three-dimensional face mesh of a target object; a processing module 1520, configured to align the three-dimensional face mesh with a first three-dimensional face model of a standard object according to face keypoints; and a fitting module 1530, configured to perform fitting on the three-dimensional face mesh and a local area of the first three-dimensional face model, to obtain a second three-dimensional face model after local fitting; and the fitting module 1530 is configured to perform fitting on the three-dimensional face mesh and a global area of the second three-dimensional face model, to obtain a three-dimensional face model of the target object after global fitting.

In certain embodiments, the processing module 1520 is configured to perform non-rigid registration on the three-dimensional face mesh and the local area of the first three-dimensional face model, to obtain a first correspondence between the local area and the three-dimensional face mesh; and the fitting module 1530 is configured to perform fitting on the three-dimensional face mesh and the local area of the first three-dimensional face model according to the first correspondence, to obtain the second three-dimensional face model after local fitting.

In certain embodiments, the apparatus includes a calculation module 1540; the calculation module 1540 is configured to perform fitting on the three-dimensional face mesh and the local area of the first three-dimensional face model according to the first correspondence, to calculate a first posture parameter of the second three-dimensional face model; the calculation module 1540 is configured to adjust a shape base coefficient of the first three-dimensional face model according to the first posture parameter, to obtain a shape base coefficient of the second three-dimensional face model; the calculation module 1540 is configured to adjust an expression base coefficient of the first three-dimensional face model according to the first posture parameter, to obtain an expression base coefficient of the second three-dimensional face model; and the fitting module 1530 is configured to obtain, according to the first posture parameter, the shape base coefficient, and the expression base coefficient, the second three-dimensional face model after local fitting.

In certain embodiments, the processing module 1520 is configured to perform non-rigid registration on the three-dimensional face mesh and the global area of the second three-dimensional face model, to obtain a second correspondence between the global area and the three-dimensional face mesh; and the fitting module 1530 is configured to perform fitting on the three-dimensional face mesh and the global area of the second three-dimensional face model according to the second correspondence, to obtain the three-dimensional face model of the target object after global fitting.

In certain embodiments, the calculation module 1540 is configured to perform fitting on the three-dimensional face mesh and the global area of the second three-dimensional face model according to the second correspondence, to calculate a second posture parameter of the three-dimensional face model of the target object after global fitting; the calculation module 1540 is configured to adjust a shape base coefficient of the second three-dimensional face model according to the second posture parameter, to obtain a shape base coefficient of the three-dimensional face model of the target object after global fitting; the calculation module 1540 is configured to adjust an expression base coefficient of the second three-dimensional face model according to the second posture parameter, to obtain an expression base coefficient of the three-dimensional face model of the target object after global fitting; and the fitting module 1530 is configured to obtain, according to the second posture parameter, the shape base coefficient, and the expression base coefficient, the three-dimensional face model of the target object after global fitting.

In certain embodiments, the obtaining module 1510 is configured to obtain a flaw of the second three-dimensional face model, where the flaw corresponds to an outlier of the first three-dimensional face model, and the outlier is a point that does not belong to the local area of the first three-dimensional face model; and the processing module 1520 is configured to filter out the flaw from the second three-dimensional face model, to obtain a second three-dimensional face model that is flawless.

In certain embodiments, the processing module 1520 is configured to: compare a norm corresponding to the global area of the second three-dimensional face model with a norm corresponding to the second three-dimensional face model after local fitting, to obtain a norm difference; and determine the flaw of the second three-dimensional face model according to the norm difference.

In certain embodiments, the obtaining module 1510 is configured to obtain a shape base coefficient and an expression base coefficient of the three-dimensional face model of the target object after global fitting; and the processing module 1520 is configured to generate a three-dimensional expression base of the target object according to the shape base coefficient and the expression base coefficient.

Figure 17:
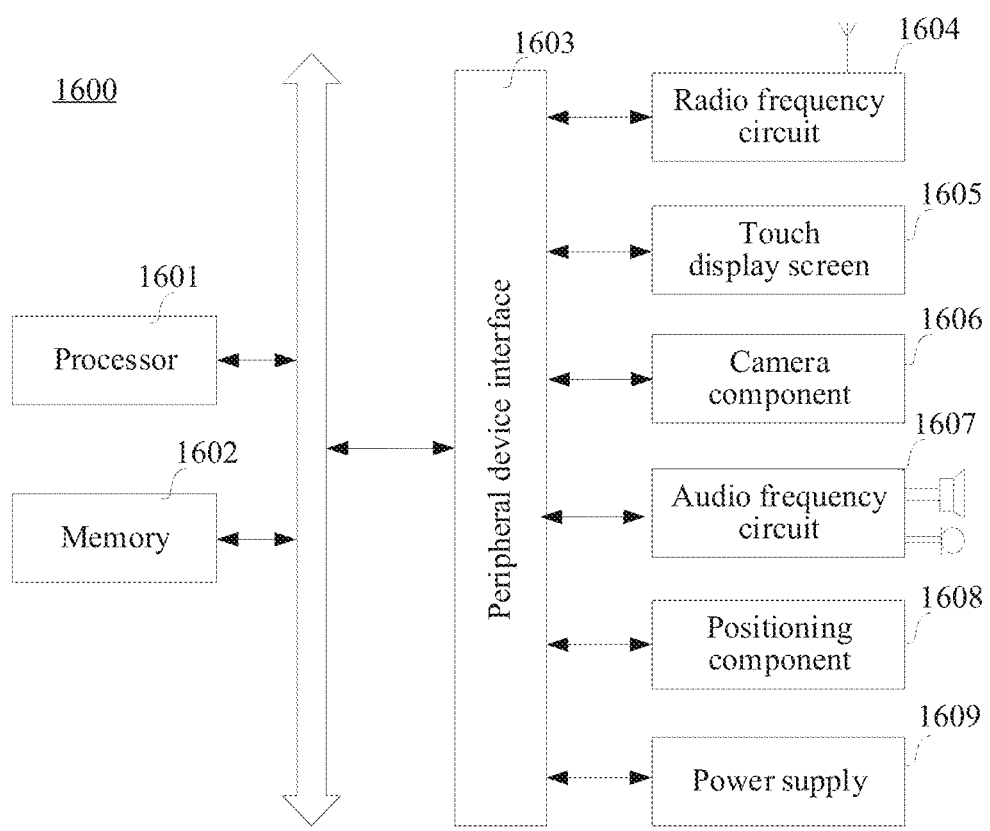
FIG. 17 is a schematic structural diagram of a computing device according to one or more embodiments of the present disclosure.

FIG. 17 is a structural block diagram of a terminal 1600 according to an embodiment of the present disclosure. The terminal 1600 may be an electronic device such as a mobile phone, a tablet computer, a wearable device, a multimedia playback device, and a camera.

Generally, the terminal 1600 includes a processor 1601 and a memory 1602.

The processor 1601 may include one or more processing cores. For example, the processor 1601 may be a 4-core processor or a 16-core processor. The processor 1601 may be implemented by using at least one hardware form of a digital signal processor (DSP), a field programmable gate array (FPGA), and a programmable logic array (PLA). The processor 1601 may alternatively include a main processor and a coprocessor. The main processor is a processor that is configured to process data in an awake state, also referred to as a central processing unit (CPU), and the coprocessor is a low-power processor that is configured to process data in an idle state. In some embodiments, the processor 1601 may be integrated with a graphics processing unit (GPU). The GPU is configured to render and draw content that may need to be displayed on a display. In some embodiments, the processor 1601 may further include an artificial intelligence (AI) processor. The AI processor is configured to process a computing operation related to machine learning.

The memory 1602 may include one or more computer-readable storage media. The computer-readable storage media may be non-transient. The memory 1602 may further include a high-speed random access memory, and a non-volatile memory such as one or more magnetic disk storage devices and a flash memory device. In some embodiments, a non-transient computer-readable storage medium in the memory 1602 is configured to store at least one instruction, at least one segment of program, a code set, or an instruction set. The at least one instruction, the at least one segment of program, the code set, or the instruction set is loaded and executed by the processor 1601 to perform the three-dimensional face model generation method or the voice interaction method provided in the method embodiments of the present disclosure.

In some embodiments, the terminal 1600 may In certain embodiments include: a peripheral device interface 1603 and at least one peripheral device. The processor 1601, the memory 1602, and the peripheral device interface 1603 may be connected through a bus or a signal cable. Each peripheral device may be connected to the peripheral device interface 1603 through a bus, a signal cable, or a circuit board. The peripheral device may include: at least one of a radio frequency (RF) circuit 1604, a touch display screen 1605, a camera component 1606, an audio circuit 1607, a positioning component 1608, and a power supply 1609.

The camera 1606 may be a three-dimensional camera formed by a color camera and a depth camera.

A person skilled in the art may understand that a structure shown in FIG. 17 constitutes no limitation on the terminal 1600, and the terminal may include more or fewer components than those shown in the figure, or combine some components, or use a different component deployment.

In an exemplary embodiment, a computer-readable storage medium is further provided, the storage medium storing at least one instruction, at least one program, a code set or an instruction set, and the at least one instruction, the at least one program, the code set or the instruction set being executed by the processor of a computing device to implement the three-dimensional face model generation method.

In certain embodiments, the computer-readable storage medium may include: a ROM, a RAM, a solid state drive (SSD), an optical disc, or the like. The random access memory may include a resistance random access memory (ReRAM) and a dynamic random access memory (DRAM).

According to another aspect of the embodiments of the present disclosure, a computer program product or a computer program is provided, the computer program product or the computer program including computer instructions, the computer instructions being stored in a computer-readable storage medium. A processor of a computing device reads the computer instructions from the computer-readable storage medium, and executes the computer instructions, so that the computing device performs the three-dimensional face model generation method provided in the implementations.

The term "a plurality of" mentioned in the present disclosure means two or more. "And/or" describes an association relationship for associated objects and represents that three relationships may exist. For example, A and/or B may represent the following three cases: only A exists, both A and B exist, and only B exists. The character "/" in the present disclosure generally indicates an "or" relationship between the associated objects.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person of ordinary skill in the art may understand that all or some of the steps of the embodiments may be implemented by using hardware, or may be implemented by a program instructing relevant hardware. The program may be stored in a computer-readable storage medium. The storage medium may be a ROM, a magnetic disk, an optical disc, or the like.

The descriptions are merely embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A three-dimensional face model generation method, applied to a computing device, the method comprising:
   obtaining a three-dimensional face mesh of a target object;
   aligning the three-dimensional face mesh with a first three-dimensional face model of a standard object according to face keypoints;
   performing local fitting on the three-dimensional face mesh and a local area of the first three-dimensional face model, to obtain a second three-dimensional face model after the local fitting, wherein the local area is an area whose fitting error rate is lower than a preset condition, the three-dimensional face mesh further includes a candidate area whose fitting error rate is higher than or equal to the preset condition, and the local fitting is not performed on the candidate area; and
   performing global fitting on the three-dimensional face mesh and a global area of the second three-dimensional face model, to obtain a three-dimensional face model of the target object after the global fitting, wherein the global fitting is performed on the candidate area to obtain the 3D face model of the target object.

2. The method according to claim 1, wherein performing local fitting on the three-dimensional face mesh and the local area of the first three-dimensional face model comprises:
   performing registration on the three-dimensional face mesh and the local area of the first three-dimensional face model, to obtain a first correspondence between the local area and the three-dimensional face mesh; and
   performing the local fitting on the three-dimensional face mesh and the local area of the first three-dimensional face model according to the first correspondence, to obtain the second three-dimensional face model after the local fitting.

3. The method according to claim 2, wherein performing local fitting on the three-dimensional face mesh and the local area of the first three-dimensional face model comprises:
   performing the local fitting on the three-dimensional face mesh and the local area of the first three-dimensional face model according to the first correspondence, to calculate a first posture parameter of the second three-dimensional face model;
   adjusting a shape base coefficient of the first three-dimensional face model according to the first posture parameter, to obtain a shape base coefficient of the second three-dimensional face model;
   adjusting an expression base coefficient of the first three-dimensional face model according to the first posture parameter, to obtain an expression base coefficient of the second three-dimensional face model; and
   obtaining, according to the first posture parameter, the shape base coefficient, and the expression base coefficient, the second three-dimensional face model after the local fitting.

4. The method according to claim 1, wherein performing global fitting on the three-dimensional face mesh and the global area of the second three-dimensional face model comprises:
   performing registration on the three-dimensional face mesh and the global area of the second three-dimensional face model, to obtain a second correspondence between the global area and the three-dimensional face mesh; and
   performing the global fitting on the three-dimensional face mesh and the global area of the second three-dimensional face model according to the second correspondence, to obtain the three-dimensional face model of the target object after the global fitting.

5. The method according to claim 4, wherein performing global fitting on the three-dimensional face mesh and the global area of the second three-dimensional face model comprises:
   performing the global fitting on the three-dimensional face mesh and the global area of the second three-dimensional face model according to the second correspondence, to calculate a second posture parameter of the three-dimensional face model of the target object after the global fitting;
   adjusting a shape base coefficient of the second three-dimensional face model according to the second posture parameter, to obtain a shape base coefficient of the three-dimensional face model of the target object after the global fitting;
   adjusting an expression base coefficient of the second three-dimensional face model according to the second posture parameter, to obtain an expression base coefficient of the three-dimensional face model of the target object after the global fitting; and obtaining, according to the second posture parameter, the shape base coefficient, and the expression base coefficient, the three-dimensional face model of the target object after the global fitting.

6. The method according to claim 4, further comprising:
obtaining a flaw of the second three-dimensional face model, wherein the flaw corresponds to an outlier of the first three-dimensional face model, and the outlier is a point that does not belong to the local area of the first three-dimensional face model; and
filtering out the flaw from the second three-dimensional face model, to obtain a second three-dimensional face model that is flawless.

7. The method according to claim 6, wherein obtaining the flaw of the second three-dimensional face model comprises:
comparing a norm corresponding to the global area of the second three-dimensional face model with a norm corresponding to the second three-dimensional face model after the local fitting, to obtain a norm difference; and
determining the flaw of the second three-dimensional face model according to the norm difference.

8. The method according to claim 1, further comprising:
obtaining a shape base coefficient and an expression base coefficient of the three-dimensional face model of the target object after the global fitting; and
generating a three-dimensional expression base of the target object according to the shape base coefficient and the expression base coefficient.

9. A three-dimensional face model generation apparatus, the apparatus comprising: at least one memory storing computer program instructions; and at least one processor coupled to the at least one memory and configured to execute the computer program instructions and perform:
obtaining a three-dimensional face mesh of a target object;
aligning the three-dimensional face mesh with a first three-dimensional face model of a standard object according to face keypoints; and
performing local fitting on the three-dimensional face mesh and a local area of the first three-dimensional face model, to obtain a second three-dimensional face model after the local fitting, wherein the local area is an area whose fitting error rate is lower than a preset condition, the three-dimensional face mesh further includes a candidate area whose fitting error rate is higher than or equal to the preset condition, and the local fitting is not performed on the candidate area; and
performing global fitting on the three-dimensional face mesh and a global area of the second three-dimensional face model, to obtain a three-dimensional face model of the target object after the global fitting, wherein the global fitting is performed on the candidate area to obtain the 3D face model of the target object.

10. The apparatus according to claim 9, wherein performing local fitting on the three-dimensional face mesh and the local area of the first three-dimensional face model includes:
performing registration on the three-dimensional face mesh and the local area of the first three-dimensional face model, to obtain a first correspondence between the local area and the three-dimensional face mesh; and
performing the local fitting on the three-dimensional face mesh and the local area of the first three-dimensional face model according to the first correspondence, to obtain the second three-dimensional face model after the local fitting.

11. The apparatus according to claim 10, wherein performing local fitting on the three-dimensional face mesh and the local area of the first three-dimensional face model includes:
performing the local fitting on the three-dimensional face mesh and the local area of the first three-dimensional face model according to the first correspondence, to calculate a first posture parameter of the second three-dimensional face model;
adjusting a shape base coefficient of the first three-dimensional face model according to the first posture parameter, to obtain a shape base coefficient of the second three-dimensional face model;
adjusting an expression base coefficient of the first three-dimensional face model according to the first posture parameter, to obtain an expression base coefficient of the second three-dimensional face model; and
obtaining, according to the first posture parameter, the shape base coefficient, and the expression base coefficient, the second three-dimensional face model after the local fitting.

12. The apparatus according to claim 9, wherein performing global fitting on the three-dimensional face mesh and the global area of the second three-dimensional face model includes:
performing registration on the three-dimensional face mesh and the global area of the second three-dimensional face model, to obtain a second correspondence between the global area and the three-dimensional face mesh; and
performing the global fitting on the three-dimensional face mesh and the global area of the second three-dimensional face model according to the second correspondence, to obtain the three-dimensional face model of the target object after the global fitting.

13. The apparatus according to claim 12, wherein performing global fitting on the three-dimensional face mesh and the global area of the second three-dimensional face model includes:
performing the global fitting on the three-dimensional face mesh and the global area of the second three-dimensional face model according to the second correspondence, to calculate a second posture parameter of the three-dimensional face model of the target object after the global fitting;
adjusting a shape base coefficient of the second three-dimensional face model according to the second posture parameter, to obtain a shape base coefficient of the three-dimensional face model of the target object after the global fitting;
adjusting an expression base coefficient of the second three-dimensional face model according to the second posture parameter, to obtain an expression base coefficient of the three-dimensional face model of the target object after the global fitting; and
obtaining, according to the second posture parameter, the shape base coefficient, and the expression base coefficient, the three-dimensional face model of the target object after the global fitting.

14. The apparatus according to claim 12, wherein the at least one processor is further configured to perform:
obtaining a flaw of the second three-dimensional face model, wherein the flaw corresponds to an outlier of the first three-dimensional face model, and the outlier is a point that does not belong to the local area of the first three-dimensional face model; and filtering out the flaw from the second three-dimensional face model, to obtain a second three-dimensional face model that is flawless.

15. The apparatus according to claim 14, wherein obtaining the flaw of the second three-dimensional face model includes:
comparing a norm corresponding to the global area of the second three-dimensional face model with a norm corresponding to the second three-dimensional face model after the local fitting, to obtain a norm difference; and
determining the flaw of the second three-dimensional face model according to the norm difference.

16. The apparatus according to claim 9, wherein the at least one processor is further configured to perform:
obtaining a shape base coefficient and an expression base coefficient of the three-dimensional face model of the target object after the global fitting; and
generating a three-dimensional expression base of the target object according to the shape base coefficient and the expression base coefficient.

17. A non-transitory computer-readable storage medium storing computer program instructions executable by at least one processor to perform:
obtaining a three-dimensional face mesh of a target object;
aligning the three-dimensional face mesh with a first three-dimensional face model of a standard object according to face keypoints;
performing local fitting on the three-dimensional face mesh and a local area of the first three-dimensional face model, to obtain a second three-dimensional face model after the local fitting, wherein the local area is an area whose fitting error rate is lower than a preset condition, the three-dimensional face mesh further includes a candidate area whose fitting error rate is higher than or equal to the preset condition, and the local fitting is not performed on the candidate area; and
performing global fitting on the three-dimensional face mesh and a global area of the second three-dimensional face model, to obtain a three-dimensional face model of the target object after the global fitting, wherein the global fitting is performed on the candidate area to obtain the 3D face model of the target object.

18. The non-transitory computer-readable storage medium according to claim 17, wherein performing local fitting on the three-dimensional face mesh and the local area of the first three-dimensional face model includes:
performing registration on the three-dimensional face mesh and the local area of the first three-dimensional face model, to obtain a first correspondence between the local area and the three-dimensional face mesh; and
performing the local fitting on the three-dimensional face mesh and the local area of the first three-dimensional face model according to the first correspondence, to obtain the second three-dimensional face model after the local fitting.

19. The method according to claim 1, wherein a quantity of face keypoints of the second three-dimensional face model is higher than a quantity of face keypoints of the first three-dimensional face model.

20. The method according to claim 1, wherein the candidate area includes at least one of a nose area or a mouth area.

* * * * *